United States Patent [19]

Major et al.

[11] Patent Number: 5,250,955
[45] Date of Patent: Oct. 5, 1993

[54] STATE ENTRY BEACON SYSTEM

[75] Inventors: Harvey W. Major, Saratoga; James C. Beffa, Sunnyvale; Frank D. Butscher, San Jose; Bruce A. Beauchamp, Sunnyvale, all of Calif.

[73] Assignee: Lockheed Information Services Company, Teaneck, N.J.

[21] Appl. No.: 894,700

[22] Filed: Jun. 5, 1992

[51] Int. Cl.$^5$ .................................................. G01S 3/02
[52] U.S. Cl. ..................................... 342/457; 342/386; 342/407
[58] Field of Search ............... 342/457, 386, 398, 407, 342/408, 415; 364/449

[56] References Cited

U.S. PATENT DOCUMENTS

| | | | |
|---|---|---|---|
| 3,996,554 | 12/1976 | Ives et al. | 340/33 |
| 4,067,061 | 1/1978 | Juhasz | 364/900 |
| 4,112,421 | 9/1978 | Freeny, Jr. | 342/457 |
| 4,209,787 | 6/1980 | Freeny, Jr. | 342/457 |
| 4,677,429 | 6/1987 | Glotzbach | 340/711 |
| 4,858,133 | 8/1989 | Takeuchi et al. | 364/424.04 |
| 4,926,331 | 5/1990 | Windle et al. | 364/424.04 |
| 4,939,652 | 7/1990 | Steiner | 364/424.01 |
| 4,962,457 | 10/1990 | Chen et al. | 364/443 |

FOREIGN PATENT DOCUMENTS 0254262 1/1988 European Pat. Off. .
0289657 11/1988 European Pat. Off. .

Primary Examiner—Theodore M. Blum

[57] ABSTRACT

A beacon system wherein a beacon station is placed at a landmark such as a state line adjacent a major highway to broadcast information-containing alternating directional signals. In addition, each vehicle may be equipped with a radio receiver, a receiving decoder and a data analysis processor for receiving data signals from the beacon station. The beacon station includes an information encoder for generating first and second alternating but distinct location signals, first and second directional antennas disposed to radiate in opposite directions along the path of travel, the directional antennas having a significant back attenuation, a radio frequency transmitter for broadcasting the two location signals, preferably as data packets, to vehicle-mounted receivers along the path of travel, and an r.f. switcher for switching signal output of the transmitter between the two antennas in synchronization with the two location signals. The data analysis processor associated with each vehicle-carried receiver includes a half-circular buffer operative to capture a succession of packets received from the receiving decoder, to preserve initially-received complete packets of the first location signals and to preserve last-received complete packets of the second location signals. The data analysis processor further includes means for processing the preserved packets in the half-circular buffer to determine the exact crossover point of the landmark marked by location of the transmitter.

6 Claims, 4 Drawing Sheets

STATE ENTRY BEACON SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to automatic sensing and recording of an indication of the crossing of a boundary, and more specifically, it relates to a system for recording the passage of a commercial load-carrying vehicle across a state line with an accurate indication of the point of crossing for revenue generating purposes.

Interstate commercial vehicles are subject to tax liability on the basis of mileage within a state. Heretofore, the drivers of interstate commercial vehicles have been required to gather the information manually and to report to state tax authorities in a document known as a driver trip envelope such information as highway used, odometer reading at border crossings, starting locations and destinations. Inaccurate information, particularly inaccurate odometer readings due to human error or due to the inconvenience of manually recording an odometer reading in a moving vehicle, is a frequent source of concern.

Interstate trucks are now frequently equipped with an on-board computer (OBC). The OBC is used for various mobile data gathering and processing tasks. One of the data gathering tasks of an OBC is the recording of odometer readings upon receipt of an indication signal.

There are significant problems with each possible technology for issuing an index of a boundary crossing. Inductive signals generated by a signal source embedded in a roadway is extremely limited in range and requires that the roadway itself be modified, which is an extremely expensive proposition. Optical or other signals generated from a true line of sight source at a roadside to a passing vehicle are subject to interference and blockage from fog or intervening vehicles and are thus easily defeated. Radio frequency or microwave signals generated from a roadside source have an indeterminate range and are difficult to distinguish in a moving vehicle on a crowded multiple-lane roadway, and they are also difficult to locate precisely and isolate from other similar sources in an extended proximity, particularly due to reflections off of moving and fixed sources.

The following patents and publications have come to the attention of the inventors in relationship to this invention:

EP 289,657A (Sumitomo) describes a two-way communication system between a single directional antenna serving a beacon function on a fixed structure and a close moving vehicle.

EP 254,262A (Sumitomo) describes a two-way communication system with a beacon function on a fixed structure and a close moving vehicle as part of a vehicle navigation system.

U.S. Pat. No. 4,962,457 discloses an interactive vehicle highway system for providing site or specific information to a vehicle operator for navigation purposes. Communication is two-way and employs an antenna system embedded in the ground.

U.S. Pat. No. 3,996,554 discloses a vehicle data gathering system wherein an inductive receiver in the vehicle picks up information from an external transmitter driving an inductive loop antenna buried in the pavement as the vehicle passes over.

U.S. Pat. No. 4,858,133 discloses use of an on-board computer similar to the type which might be used as an information-gathering apparatus in connection with the invention herein. However, nothing is disclosed regarding the capturing of information from a remote source via radio or the automatic logging of landmark information.

U.S. Pat. No. 4,926,331 discloses another on-board processor with automatic data recording capabilities for information about the vehicle.

U.S. Pat. No. 4,939,652 discloses still another on-board processor with data recording capabilities about the vehicle plus provision for manual input of state location.

U.S. Pat. No. 4,677,429 discloses an on-board processor with data recording capabilities in connection with provision for manual input of state location information from the vehicle, together with a provision for a radio frequency link to a fixed receiver to download information from the on-board computer to the fixed station.

U.S. Pat. No. 4,067,061 discloses simple on-board data capturing device which has provision for manual entry of state location information.

It is desirable to provide automated recording of odometer readings of interstate vehicles which takes advantage of the availability of an on-board computer system to minimize inaccuracies in data recording and to provide a convenient and accurate method for issuing, capturing and accurately logging an indication of a boundary crossing such as at a state border.

SUMMARY OF THE INVENTION

According to the invention, a beacon system is provided wherein a radio beacon station is placed at a landmark such as a state line adjacent a major highway to broadcast information-containing alternating directional signals. In addition, each vehicle may be equipped with a radio receiver, a receiving decoder and a data analysis processor for receiving data signals from the beacon station. The beacon station includes an information encoder for generating first and second alternating but distinct location signals, first and second directional antennas disposed to radiate in opposite directions along the path of travel, the directional antennas having a significant back attenuation, a radio frequency transmitter for broadcasting the two location signals, preferably as data packets, to vehicle-mounted receivers along the path of travel, and an r.f. switcher for switching signal output of the transmitter between the two antennas in synchronization with the two location signals. The data analysis processor associated with each vehicle-carried receiver includes a half-circular buffer operative to capture a succession of packets received from the receiving decoder, to preserve initially-received complete packets of the first location signals and to preserve last-received complete packets of the second location signals. The data analysis processor further includes means for processing the preserved packets in the half-circular buffer to determine the exact crossover point of the landmark marked by location of the transmitter.

DESCRIPTION OF SPECIFIC EMBODIMENT

Figure 1:
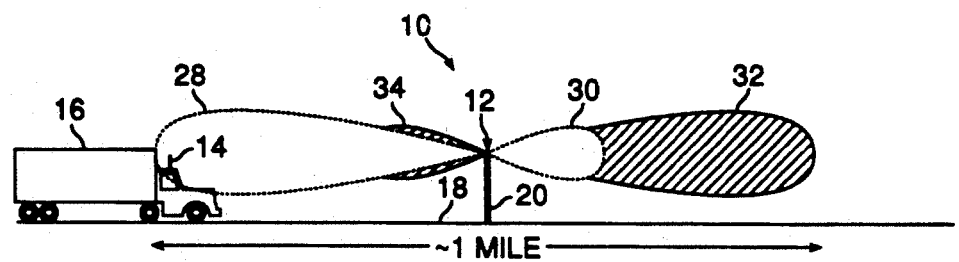
FIG. 1 is a side view of a beacon system in accordance with the invention.
Figure 2:
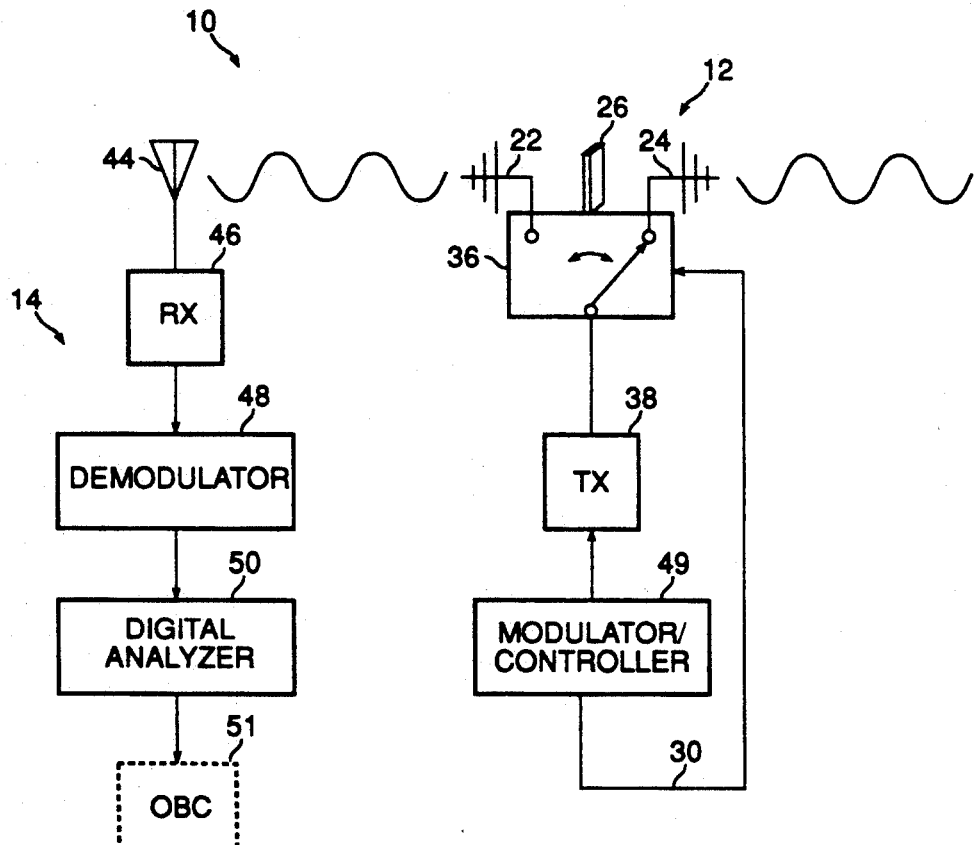
FIG. 2 is a block diagram of a beacon system in accordance with the invention.

Referring to FIG. 1, there is shown in side view an environment for a beacon system 10 according to the invention which includes a transmitter beacon station 12 and at least one receiving subsystem 14 mounted in a mobile road vehicle such as a truck 16 moving on a highway 18 which passes the transmitter beacon station 12. The transmitter beacon station 12 is typically mounted on a pole 20 which is in plain view in both directions along a path of travel represented by the highway 18. Referring to FIG. 2 in connection with FIG. 1, the transmitter beacon station 12 comprises a first antenna 22 and a second antenna 24 each of which produces a highly directional radiation pattern. A typical antenna is a vertically-polarized, multiple-element yagi. Antennas 22 and 24 may be in close proximity to one another oriented to radiate in substantially opposite directions and having a reflective shield 26, such as a flat metal plate, separating the two antennas. The first antenna 22 produces a forward radiating pattern or first forward lobe 28 directed up the highway 18 (toward an approaching vehicle with a receiver 14) and a lower intensity generally short range first back lobe 30 directed down the highway 18. The second antenna 24 produces a second forward lobe 32 oppositely directed down the highway with a second back lobe 34 directed up the highway 18. Under ideal propagation conditions, that is, in the absence of multi-path reflections or unusual atmospheric conditions, reception of the signal produced by a forward lobe can be expected to occur ideally without detection of signals produced by the back lobe of the other antenna. In close proximity to the beacon station 12, the back lobe radiation power level is above a squelch level for detection and thus alternating signals can be expected to be received from both antennas without difficulty.

The transmitter beacon station 12 comprises in addition a switcher 36 coupled to each of the antennas 22 and 24 for alternately switching an input RF signal between the two antennas. The switcher is driven by a transmitter 38 generating signals in preferably the 1.4 GHz frequency band (L-band) at power levels of less than a few watts and ideally at power levels of only a few milliwatts. The transmitter 38 is driven by a modulator/controller 49. The modulator/controller 49 has as its primary function the generation of alternating first and second location signals to alternately switch the switcher between the respective first and second antennas 22 and 24 via a control line 31. The modulator/controller 49 provides switching synchronization signals to the switcher 36 (via line 42). Preferably the modulator/controller 49 produces digitally-generated modulation signals representing packets of information as explained hereinafter, and the control signal on line 31 merely causes the switcher 36 to alternate the transmitter 38 signal output between the first antenna 22 and the second antenna 24 with each alternating packet signal transmission.

The modulator/controller 49 may comprise for example a terminal nod controller which is programmed to send alternating beacon signals through an internal processor. The controller portion could also be a simple external exciter which generates alternating beacon signals and controls the switcher 36.

Further according to the invention, the receiver subsystem 14, which is installed in the truck 16, comprises an omnidirectional antenna 44 coupled to a receiver 46 which in turn drives a demodulator 48. The demodulator 48 provides digital signals to a digital analyzer 50, the operation of which is hereinafter explained. The output of the digital analyzer is provided to a conventional on-board computer (OBC) 51, which is carried in or mounted to the vehicle as part of the normal control and monitoring function of an interstate truck. The receiver 46 is a receiver matched to the frequency and modulation of the transmitter 38. The demodulator 48 is for demodulating the signals produced by the modulator/controller 49. The demodulator 48 may for example, be a packet terminal node controller or equivalent device for demodulating packet signals sent in a frequency-shift keyed (FSK) format.

Because the beacon system 10 produces RF signals which are fixed in source and only approximately directionally sensitive, it is helpful for the location signals produced by the transmitter beacon station 12 to contain information useful for identifying location of the beacon and direction of travel of a receiving subsystem 14 having only an omnidirectional receiving antenna. Unlike expensive and relatively-complex radial direction finding systems of the prior art, the present invention employs information embedded in a pair of alternating location signals to determine direction and further analyzes the reception pattern of those location signals to determine location. Moreover, other information may also be conveyed in packetized format from the beacon station 12 to the receiving subsystem 14, such as station identification.

Figure 3:
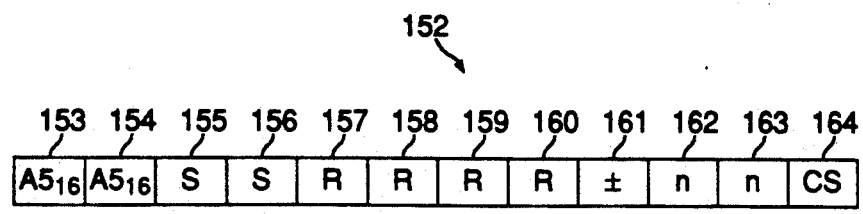
FIG. 3 is an illustration of a typical message format.

Referring to FIG. 3, there is shown the format for a broadcast message packet in a specific embodiment of the invention. The packet format 152 comprises for example twelve characters 153-164, each of which is an ASCII 10-bit or an 8-bit character. Characters 153 and 154 are each binary packet framing characters. Frames 155 and 156 are a two-character mnemonic for a state, province, country or the like indicating the jurisdiction which is being approached by a receiving station and which is broadcast from the directional antenna with preference toward the approaching vehicle. Characters 157-160 are for the route number or more specifically a transmitter location identifier. Characters 161-163 are a representation of the distance between the beacon site and the landmark or boundary to be marked, for those systems where the beacon must be displaced from the exact boundary or a state border. Character 164 is a checksum of the previous characters for use by the receiver in verifying the integrity of the received data packet. Other information could be included in an extended packet, such as date and time. However, a shorter beacon signal packet is preferred over a longer beacon signal packet due to the susceptibility of packets to corruption in actual operating environments.

Figure 4:
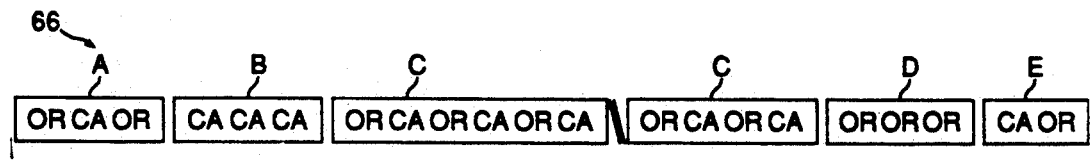
FIG. 4 is a timing diagram illustrating a typical data pattern by packet type.

FIG. 4 illustrates a typical data pattern received at a mobile receiver from a fixed beacon station 12 broadcasting alternating packets in nominally opposite directions as a mobile receiver 14 approaches and passes the fixed beacon station 12 (FIG. 1). In this example, the data pattern 66 is represented by the two mnemonics: "OR" (for Oregon) and "CA" (for California). This data pattern is received by a vehicle 16 approaching the California border from Oregon along a highway which is subject to multi-path reflections. In a preferred embodiment, the timing diagram for this data pattern would represent approximately three packets per second, or 180 packets over a period of one minute where, if the packet is twelve characters long, about 21,000 bits are transmitted during a minute. The typical data pattern is that a certain number of packets are detected and received at the beginning of signal acquisition from both antennas (Period A). Thereafter, consecutive packets are received from the antenna whose main lobe points toward the approaching receiver (Period B). Thereafter, as the receiver nears and passes the station, both signals are detectable by the receiver and hence detects an alternating pattern of signals (Period C). Thereafter, as the moving receiver moves further from the site of the beacon transmitter, there will be a sequence of packets from the second antenna which does not alternate with the packets from the first antenna (Period D). Finally, there may be a period when the packets again alternate, due to multi-path effects (Period E). The first period A and the last period E are uncommon but generally brief when they occur. However, such occurrences must be taken into account. Periods B and C generally extend for a substantial amount of time, as does Period D. A typical sequence involves receipt of about eighty complete and error-free packets.

The fact that there is a sequence of like packets can be used to identify direction in accordance with the invention. The onset and termination of both periods B and D of the sequences of like packets can be used in connection with a simple clock to determine with relative precision the location of the beacon signal relative to the path of travel. This analysis is carried out in the digital analyzer 50.

Figure 5:
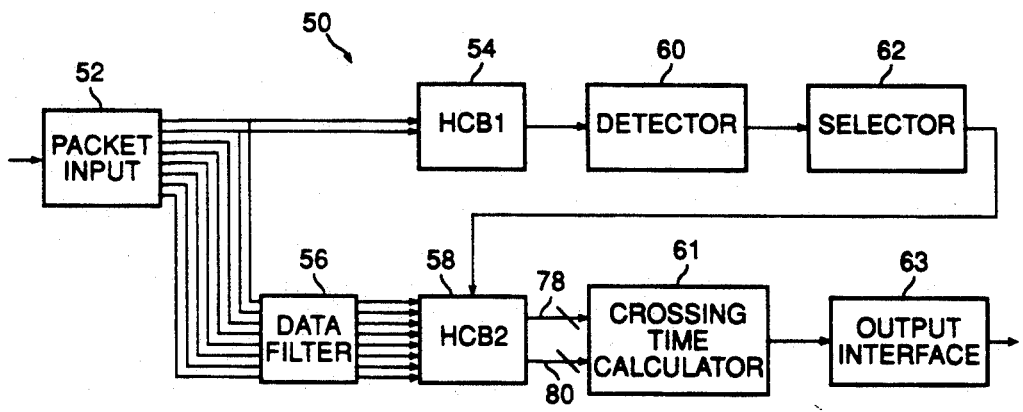
FIG. 5 is a block diagram of a data acquisition subsystem showing in a receiver dual half-circular buffers.

Referring to FIG. 5, there is shown one possible embodiment of a digital analyzer 50 in accordance with the invention. The digital analyzer 50 comprises a packet input 52 coupled to a first half-circular buffer 54 and through a data filter 56 to a second half-circular buffer 58. The first half-circular buffer 54 provides output to a detector 60 which in turn feeds a selector 62. The first half-circular buffer 54 is for capturing and analyzing only the state mnemonics (fields 55 and 56 of FIG. 3). The selector 62 is for designating to the second half-circular buffer which packets are to be used for further analysis. The output of the second half-circular buffer 58 is provided to a crossing time calculator 61 whose function is to calculate the crossing time from the relative timing of the packets received in the second half-circular buffer 58. The crossing time calculator 61 provides its output in the form of a time mark or an interrupt to an output interface 63, which in turn is coupled to the on-board computer 51 (FIG. 2).

The data filter 56 is used to reject packets incompletely received or received in error. The data filter 56 is operative to compare the checksum field 64 (FIG. 3) with the sum of bits in the associated packet. Only those packets which are received correctly are stored in the second half-circular buffer 58.

In contrast, the first half-circular buffer 54 captures the state mnemonics, whether or not the associated packet is received free of error.

Figure 6:
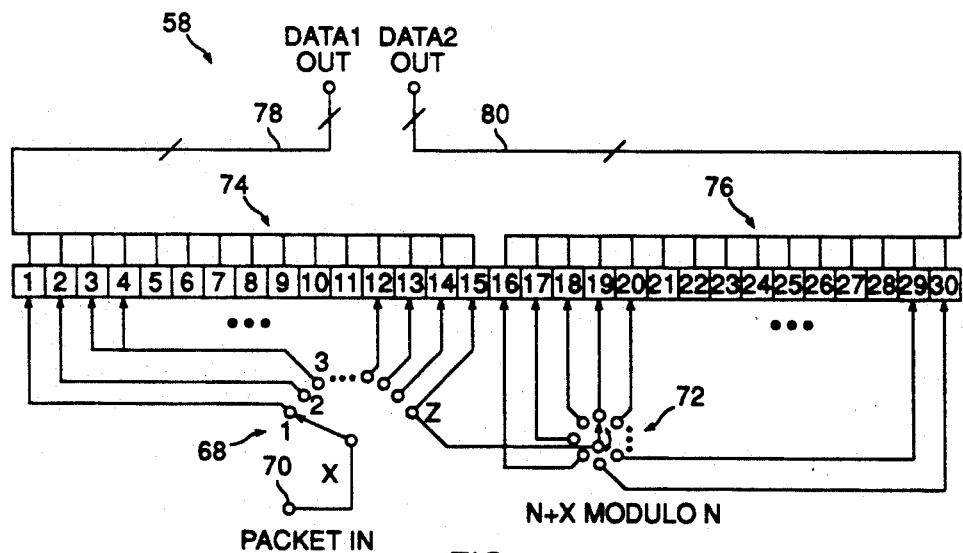
FIG. 6 is a block diagram of an illustrative half-circular buffer.

An important feature of the invention is the half-circular buffer. FIG. 6 illustrates one possible embodiment of a half-circular buffer 54. A half-circular buffer is a digital storage device which in this embodiment loads initially-received data in a first half of the buffer and last-received data in a second half of the buffer, the last-received data being determined by successively overwriting the storage locations or cells in the last half of the buffer. The half circular buffer 54 may be a digital memory device of sufficient word width such that each cell can contain an entire packet or that portion of the packet of interest in accordance with the invention. The cell address to which a packet is written is determined by the following process:

For cells numbered 1 through N, the address is X, where X is a variable;

For cells numbered N+1 through 2N, the address is:

$$N+X \text{ modulo } M.$$

This addressing scheme can be depicted as in FIG. 6 wherein a first or monotonic switch 68 demultiplexes packet data input at an input port 70 to storage locations 1-15, where N=15, and then directs data to a second or recirculating switch 72 so that the address cycles between for example, 16 and 30. Thus, in half-circular buffer 54, the first half of the buffer 74 always contains the first fifteen packets and the last half of the buffer 76 always contains the last fifteen packets. Output of the packets is provided over a first bus 78 and a second bus 80 to crossing time calculator 60 (FIG. 5).

Figure 7:
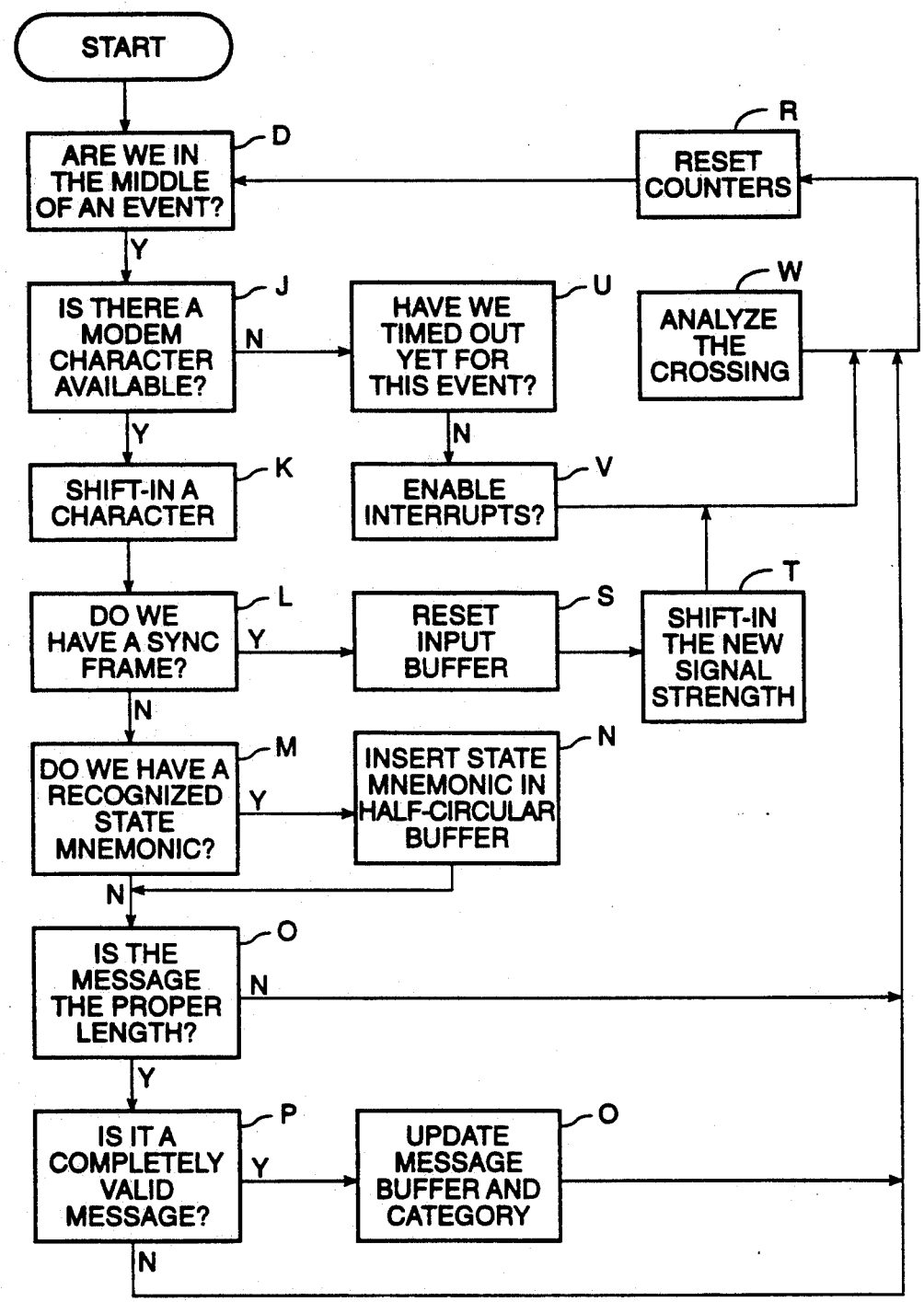
FIG. 7 is a flow chart for illustrating operation of a data analysis subsystem.

FIG. 7 is a flow chart illustrating the operation of processing in a digital analyzer 50 in accordance with the invention. In a software-controlled operation, this process is based on instructions carried out in a microprocessor. However, a microprocessor is not necessary for the operation of a system according to the invention.

Each cycle starts with a determination that an event is in process (step F). If the test indicates that an event is in progress, the operation proceeds. The processor tests to determine whether there are characters at an input port to the receive modem which are ready to be read (step J). If yes, the processor shifts in a character (step K) and tests to determine whether a sync frame is present (step L). If no sync frame is present, the processor tests to determine whether the data is a valid and recognized state mnemonic (step M). If there is a recognized state mnemonic, the state mnemonic is inserted in the next available insertion point in the first half-circular buffer 54 (step N). If not, the system tests whether there is a message of proper length (step 0) and if so, it determines whether it is a completely valid message (step P). If it is a valid message, the message buffer is updated along with its category (step Q) and then resets counters (step R). If it is not a valid message, it simply resets the counters (step R). If the message is not of the proper length, the system also resets the counters (Step R). If the sync frame has been received (at step L), the input buffer is reset (step S) and the processor shifts in a new signal strength reading (if the receiver is equipped to provide such a reading), signal strength being one of the parameters which is monitored through the receiver (step T). Thereupon the counters are also reset (step R).

If there are characters at the port ready to be read in (at step J), then the processor tests to determine whether the event has timed out, that is, whether the approach and passing of the beacon has occurred (step U). If the event has not timed out, interrupts are enabled (step V) and the counters are reset (step R). If the event has timed out, then the crossing point is determined by analyzing the crossing (step W), as hereinafter explained.

Figure 8:
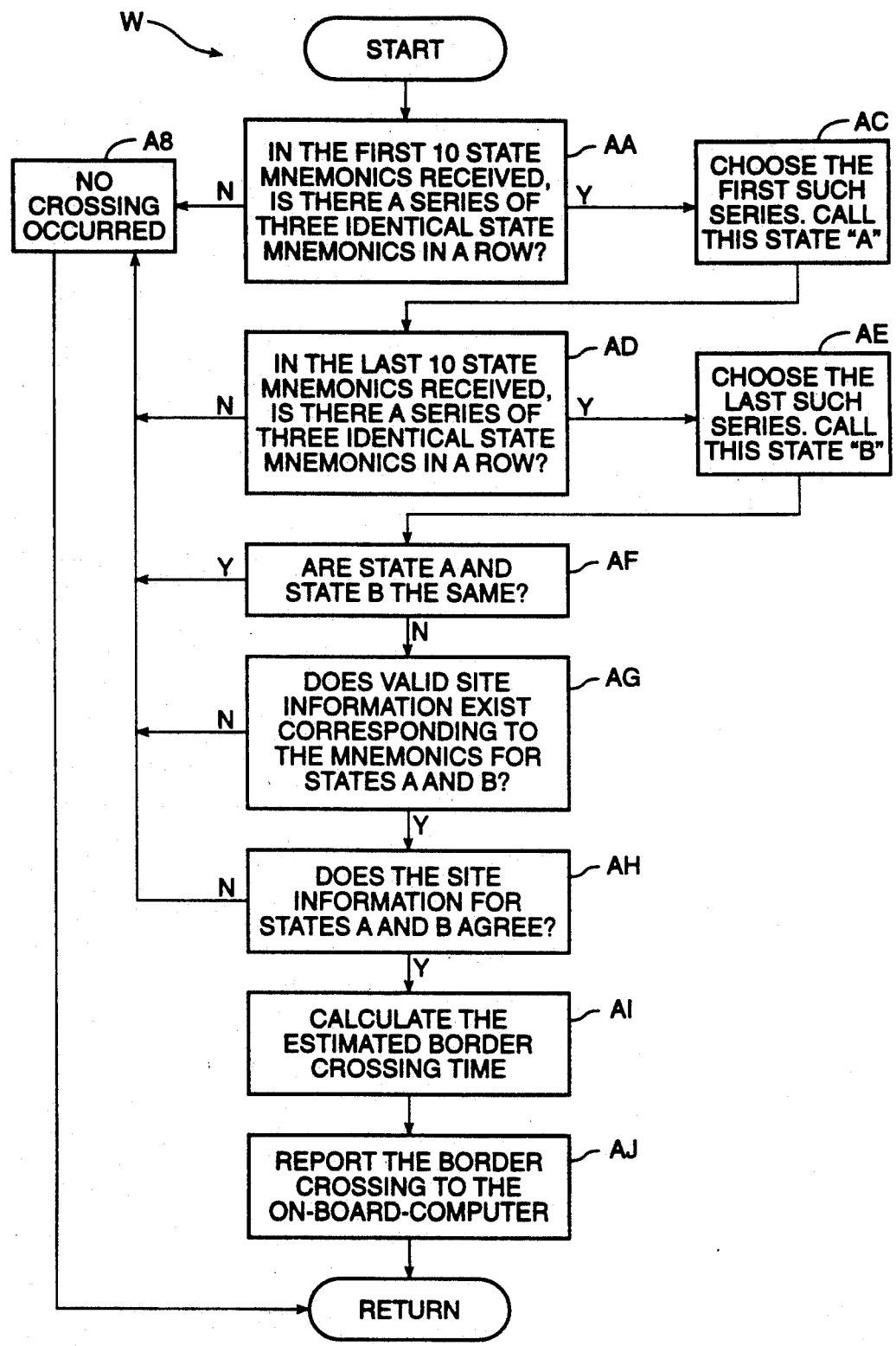
FIG. 8 is a flow chart for illustrating a boundary crossing discrimination method.

FIG. 8 is a flow chart for a specific embodiment of a crossing analysis (step W, FIG. 7). Initially, the first ten state mnemonics from the first half-circular buffer 54 are examined to determine if in those first ten mnemonics there is a series of three identical state mnemonics in a row (step AA). If not, it is immediately concluded that no crossing has occurred (step AB), the analysis is terminated, returned and the counters reset (FIG. 7 step R). If three identical state mnemonics in a row are detected, then the first three of such series are selected and designated state A (step AC). Next, the last ten state mnemonics received are examined from the first half-circular buffer 54 and tested to see if there is a series of three identical state mnemonics in a row (step AD). If not, it is immediately concluded that no crossing has occurred (step AB). If three identical state mnemonics in a row are identified, then the processor chooses the last of such series and categorizes them as a state B (step AE). Thereafter, the processor determines whether state A and state B are the same (step AF). If so, it is immediately indicated that no crossing has occurred (step AB). If not, then the processor tests to determine whether valid site information exists in the second half-circular buffer 58 (FIG. 5) which corresponds to the mnemonics for states A and B (step AG). If such information does exist, the processor tests to determine whether the site information for said states A and B agree, indicating that the packets producing that site information came from the same site (step AH). If not, no crossing could have occurred (step AB). However, if the site information agrees, the processor calculates the estimated border crossing time (step AI). The calculation is made by comparing the time of last occurrence of the first state A with the time of first occurrence of the second state B and dividing the time by two. Thereafter, the processor reports that a border crossing has occurred, along with the relative time of crossing and offset from the boundary of interest, to the on-board computer 51 (step AJ) and returns to reset the counters (step R FIG. 7). A source code listing in the c language of the relevant processes herein described is attached in an appendix.

The invention has now been explained with reference to a specific embodiment. Other embodiments will be apparent to those of ordinary skill in the art. It is therefore not intended that the invention be limited, except as indicated by the appended claims.

```
/****************************************************************
* SEBR1_1.C  Version 1.1
*
* This is the version of the SEB receiver code for the Lockheed
* designed and built computer.
*
*
* Copyright 1992  Lockheed Missiles and Space Co., Inc.
****************************************************************/

// Control Port Globals
UCHR    ControlInputBuffer[BUFFERSize];
UCHR    ControlInputIndex;
UCHR    ControlByteBuff[1];         /* control port single byte buffer */

UCHR    ControlOutputBuffer[100];
UCHR    ControlOutputFlag;
UCHR    ControlOutputIndex;
UCHR    DataBuffer[255];    // Interim MODEM Buffer // Data Port Globals idata UCHR    DataInputBuffer[BUFFERSize];
idata UCHR    DataInputFlag;
idata UCHR    DataInputIndex;
idata UCHR    BuffInPtr;            // Ptr used by Modem ISR
idata UCHR    BuffOutPtr;           // Ptr used outside Modem ISR
idata UCHR    NewChar;              // Most recent char received by MODEM
idata UCHR    OldChar;              // Previous char received by MODEM
idata UCHR    NewSS;                // Most recent signal strength reading
idata UCHR    SSBuff[44];           // Circular; contains Signal Strength
idata UCHR    SSInPtr;              // Ptr to next input to SSBuffer
idata UCHR    SSOutPtr;             // Ptr to next output from SSBuffer
idata UCHR    CrossingPending;      // = 1 if event started but not finished
idata ULNG    LastTime;             // Time of most recent received character
idata UCHR    no_check_ptr;         // Current position in the NCS buffer
idata UCHR    no_check_wrap;        // If NCS buffer wrapped around, = 1,
                                    // else, = 0
```

```
idata UCHR      no_check_buff_half;   // No Checksum Buffer midway point
idata UCHR      no_check_buff_size;   // No Checksum Buffer size
idata UCHR      no_check_buff[20];    // Buffer for the no check sum algorithm
idata UCHR      NewOutChar;           // Most recent char out of the Rx buffer
idata UCHR      OldOutChar;           // Next most recent char out of Rx buffer
idata UCHR      InterruptsDisabled;   // = 1 if Interrupts are disabled
idata ULNG      TimerCounts;          // No. of Timer Interrupt counts since
                                      // startup
idata float     TCounts_Sec;          // No. of Timer Interrupt counts per se
idata UCHR      ControlInputFlag;     // 1 = Control Port has a complete mess
idata UCHR      ControlByteFlag;      // 1 = Byte received at control port
idata UCHR      Categories;           // No. of valid msg categories for this
                                      // xing // Timer variables and flags UINT    MonIntCount;
UINT    CrossingCount;

// Monitoring stuff
#define EXTREMES          (3)
#define EVENTS            (50)

// the number of bins and the number of shifts to make a char index the bins
#define BINS            (8)    /* The number of bins and shifts to make  */
define BINShift        (5)    /* a char index the bins.                 */ struct MsgRcdStruct
/* Category corresponds to an element of the Category array
   ReceivedTime is the time in seconds since the beginning of the event.
   SS is the received Signal Strength                                    */
{
  UCHR    Category;
  ULNG    ReceivedTime;
  UCHR    SS;           // Received Signal Strength
};

struct CategoryStruct
{
  UCHR  Site[10];       /* Site information for this category      */
  ULNG  FirstTime;      /* Time of the first and last messages in the */
  ULNG  LastTime;       /* in a given category for this event         */
  UINT  Count;          /* No of msgs in this category for this event */
};

struct EventRecord
{
        UCHR Type;
        ULNG Time;
};

struct ExtremeList
{
        UCHR    Last;
        UCHR    LastLast;
        UCHR    NextMaxima;
        UCHR    Maxima[EXTREMES];
        ULNG    MaximaTime[EXTREMES];
        UCHR    NextMinima;
        UCHR    Minima[EXTREMES];
        ULNG    MinimaTime[EXTREMES];
    /*
        struct  STime MinimaTime[EXTREMES];
        struct  STime MaximaTime[EXTREMES];
    */

};

UCHR            EventTypes;
UCHR            Event;
```

```
struct          EventRecord         EventList[EVENTS];
struct          ExtremeList         PowerExtremes;
struct          ExtremeList         OnboardTempExtremes;
struct          ExtremeList         OffboardTempExtremes;
UINT            PowerBin[BINS];
UINT            OnboardTempBin[BINS];
UINT            OffboardTempBin[BINS];
UCHR            PowerFail;          // EventType
UCHR            Void;               // EventType
UCHR            valid_tx_time, xmit_time_err;
ULNG            RxBaseTime;   // Start Time of current event in sec.
ULNG    MessageRecords; /* # of msg records recorded during this xing */
UINT    NextRecord;     /* index of next MessageRecord element
                                    to be filled */
struct MsgRcdStruct  MessageRcd[MESSAGERecords];
struct CategoryStruct Category[OVERFLOWCategory+1];
ULNG    RxTxTimeDelta ;   /* Seconds difference between tx and rx clocks */
UCHR    State[STATES*2];  /* List of states in our lookup table */
ULNG    LastSignalTime;   /* Time of the last received signal */
UCHR    First, Second;    /* 1st and 2nd states to be tested for xing */
ULNG    CrossingTime;     /* Est. time in UNIX seconds of the xing */
ULNG    ElapsedTime;      /* Time in secs between the xing
                             & report of xing */
UCHR    small_buff[2];    // 2-character shift buffer for use
                             in Algorithm 2

UCHR       Status;        // module status
UCHR       Results;       // BIT results
UCHR       I2CAddress;
INT        TimeoutCounter; // Used to simulate Event Timeout
UCHR       TxBaseTime[10]; // Holds transmitter time.

// I2C Bus
STRUC Message I2CInputBuffer;
UCHR          I2CInputFlag=FALSE;
STRUC Message I2COutputBuffer;
UCHR          I2COutputFlag=FALSE;
UCHR          Address;

/***********************************************************************
* prototypes
************************************************************************
void BEGINControlOutput();
UCHR cmin(UCHR A, UCHR B);
UCHR CrossingDone();
UCHR DirectionAlgorithm2();
void InitGlobals();
void ModemISR();
UCHR MonitorPeriod();
void PerformCommand();
void ReInitGlobals();
void ReportStartup();
ULNG RxClock();                     // Returns Receiver # of seconds
void sort(INT n, UINT arr[], UCHR brr[]);
void TimerISR();
void triggerSSADC();
void InitTimer();
void timer_off();
void timer_on();
void reset_monitor_timer();
void reset_crossing_timer();
void GetControlByte();
void GetDataByte();
void StartControlInput();
void PerformCommand();
void bdtemp_init();
INT  bdtemp();
void flash_msg_rcvd();
void ValidateMessage();
void EvaluateCrossing();
```

```c
void MonitorUnit();
void RecordExtremes(UCHR value, struct ExtremeList *list);
UCHR Checksum();
UCHR ParameterError();
void Delay();
UCHR DetermineDirection();
void ReportCrossing();
UCHR adc_get_value();
void adc_start(UCHR address);
UCHR con_port_recv();
void con_port_send(UCHR temp);
void I2CBusISR();
void init();
void init_globals();
void InitI2CBus();
void InputI2CMessage(UCHR address, size);
UCHR modem_recv();
void OutputI2CMessage(UCHR address, size);

/*******************************************************************
* main - Initializes the module and performs main loop.
*******************************************************************/
main()
{
  init();

while (1) { if (CrossingPending) {
        P4 = P4 | 0x08;        // Turn on CrossingPending LED...
        if (BuffInPtr == BuffOutPtr) {  // No characters pending...
          P4 = P4 & 0xE8;              // Turn off Char Pending LED
          if (CrossingDone()) {
            EvaluateCrossing();
          }
          else
          {
            if (InterruptsDisabled) {
               S0CON = 0x50;
               InterruptsDisabled = FALSE;
            }
          } // end if
        }
        else  //  Character is pending
        {
          P4 = P4 | 0x10;       // Turn on Character Pending LED
          GetDataByte();
          if (DataInputFlag) {
            ValidateMessage();
            DataInputFlag = FALSE;
            DataInputIndex = 0;
          }
        } // end if
    }
    else  // no crossing is pending, so we have time for other things...
    {
      P4 = P4 & 0xF7;  // Turn off CrossingPending LED
      if (MonitorPeriod()) MonitorUnit();
    } // end if } // end while } /* end main */

UCHR CrossingDone()
/*******************************************************************
* Reads the I2c Clock, and checks to see if two minutes have gone by
```

```
 * since the last received signal.  If so, this TRUE is returned,
 * otherwise 0 is returned.
 *******************************************************************/
{
  if ((RxClock() - LastTime) > 60) {
    return(TRUE);
  }
  else
  {
    return(FALSE);
  }

}

UCHR DirectionAlgorithm2()
/*******************************************************************
 * This is the algorithm which uses the ordered list of state mnemonics
 * received (regardless of whether or not the checksum was correct).
 * This is the second of two algorithms which will be used to detect a
 * border crossing. (The other is DetermineDirection...)  This algorithm
 * searches the received mnemonic list for the first occurrence of three
 * of the same state mnemonics in a row, starting from the event onset.  If
 * three identical mnemonics are not found in the first 10 signals, then
 * the conclusion is that the data does not support a crossing/no cross
 * dtermination.  The same test is applied to the trailing state mnemonics.
 * Ultimately, if either the DetermineDirection of DirectionAlgorithm2
 * functions detect a crossing, a crossing will be reported.
 *******************************************************************/
{
  /*****    Initializations    *****/

UCHR  i, finished, first_identified, second_identified, last_char;
  UCHR  last_last_char, current_char, count, j;
  UCHR  first_temp, second_temp;

first_temp = 0;      // Temporary variables for first, second globals
  second_temp = 0;
  finished = FALSE;
  i = 0;
  j = 0;
  count = 0;
  first_identified = FALSE;  // Have we found a "leading" state?
  second_identified = FALSE; // Have we found a "trailing" state?
  last_char = 0;
  last_last_char = 0;
  current_char = 0;

/***   Look for the "Leading" state in the series   ***/ i = 0;

while (!finished) {
    last_last_char = last_char;     // This forms a 3-element buffer.
    last_char = current_char;       // We're looking for three states
    current_char = no_check_buff[i]; // a row.
    if ((last_last_char==last_char) && (last_char==current_char)) {
    /* We've found the leading state, now let's get the site, offset
       info from the Category buffer.                               */ j = 0;
      while (!first_identified) {
        if (current_char == Category[j].Site[0]) {  // Aha!
          first_temp = j;
          first_identified = TRUE;
        }
        else
        {
          ++j;
```

```
      if (j>Categories) break;  // Something's gone terribly wrong...
    }/* end if */
   } /* end while */
   finished = TRUE;
 } /* end if */
 ++count;
 ++i;
 if (count > cmin(no_check_ptr,10)) finished = TRUE;
} /* end while */

/*** Now, if a leading state was identified, let's look for a
     trailing state.  If no leading state was identified, it's kind
     of useless to look for a trailing state.  We find the trailing
     state by looking from the end of the no_check_sum buffer
     backwards for a series of three identical state mnemonics. ***/ if (first_identified) {
  count = 0;
  finished = FALSE;
  last_last_char = 0;
  last_char = 0;
  current_char = 0;
  i = no_check_ptr-1;    // Start looking at end of no_check_buffer...
  if (no_check_wrap && (i==9)) i = 19;
  while (!finished) {
    last_last_char = last_char;
    last_char = current_char;
    current_char = no_check_buff[i];
    if ((last_last_char==last_char) && (last_char == current_char)) {
      j = 0;
      second_identified = FALSE;
      while (!second_identified) {
        if (current_char == Category[j].Site[0]) {
          second_temp = j;
          second_identified = TRUE;
        }
        else
        {
          ++j;
          if (j > Categories) break; // Something is terribly wrong...
        } /* end if */
      } /* end while */
      finished = TRUE;
    } /* end if */
    ++count;
    --i;
    if (count >= 10) {
      finished = TRUE;
    }
    else if ((i < no_check_buff_half) && no_check_wrap) {
      i = no_check_buff_size;
    }
    else if (i < (no_check_ptr/2)) {
      finished = TRUE;
    }
  } /* end while */
} /* end if */

/*** By now, we have either found and identified the leading and
     trailing states, or we haven't.  If we have, then return a 1,
     and update the first and second state pointers.  Otherwise,
     return a zero.                                              ***/ if (first_identified && second_identified && (!(first_temp==second_temp)))
{
  First = first_temp;
  Second = second_temp;
  return(TRUE);
}
else
{
```

```
      return(FALSE);
   )

) /* end DirectionAlgorithm2 */

UCHR DetermineDirection()
/*******************************************************************
* DetermineDirection - Determines the direction of a crossing from the time
* and sequence of arrival of the pair of selected message categories. It
* sets First to the state exited and Second to the state entered. It also
* calculates a CrossingTime and an ElapsedTime since the crossing.
*******************************************************************/
(
   UCHR  Merit, Factor[FACTORS];
   UCHR  tmp, category;
   UINT message;

// Select candidate for First
   if (First > Second) // Recall that categories are assigned in time order
(                     //   therefore the lesser category started first.
   tmp = First;
   First = Second;
   Second = tmp;
)

/*  Factor[0] is number of messages in First category
    before any in Second   */ message = Factor[0] = 0;
do
(
   category = MessageRcd[message++].Category;
   if (category == First)
   (
      Factor[0]++;
      if (Factor[0] >= MAXCount)
         break;
   )
   else
      if (category == Second)
         break;
) while ( (message < MessageRecords) && message < (MESSAGERecordsHalf) );

// Factor[1] is number of messages in Second category after all in First

Factor[1] = 0;
if (MessageRecords < MESSAGERecords) // no wrap => simple down search
(
   message = MessageRecords;
   do
   (
      category = MessageRcd[--message].Category;
      if (category == Second)
      (
         Factor[1]++;
         if (Factor[1] >= MAXCount)
            break;
      )
      else
         if (category == First)
            break;
   ) while (message > 0);
)
else // overflow => count from NextRecord-1 to NextRecord with wrap
(
   message = NextRecord;
   do
   (
      if (--message < MESSAGERecordsHalf)
         message = MESSAGERecords-1;
```

```
            category = MessageRcd[message].Category;
            if (category == Second)
            {
                Factor[1]++;
                if (Factor[1] >= MAXCount)
                    break;
            }
            else
                if (category == First)
                    break;
        } while (message != NextRecord);
    }

// calculate product of factors (ranges from 0 to 25)

Merit = Factor[0] * Factor[1];
    if (Merit < 12) {
        CrossingTime = (Category[First].LastTime
                        + Category[Second].FirstTime)/2;
        return FALSE; // ambiguous crossing => don't report
    }

// calculate Crossing Time estimate
    // This is in receiver clock seconds

CrossingTime = (Category[First].LastTime + Category[Second].FirstTime)/2;
    return(TRUE);

} // DetermineDirection void EvaluateCrossing()
/***********************************************************************
* EvaluateCrossing - Finds the two likeliest categories of valid messages
* received during the crossing and determines what the likely direction was.
* If the direction determination yields a high confidence, the crossing is
* reported to the On-board computer (OBC), if not, the ambiguous crossing is
* not reported to the OBC.
*   The likliest message categories are not necessarily the largest, as the
* two largest categories may disagree. If they disagree, the combinations
* are tried with other category pairs of decreasing aggregate size until
* they agree. If no pair agree, the crossing is not reported to the OBC.
*   Note: the pair selection algorithm does not necessarily try all possible
* combinations, but it will try at least the three most likely pairs. If
* none of these agree, you're almost certain to get an ambiguous or
* erroneous crossing anyway.
*
* Checks performed:
*   roadway number and offset are consistent between 1st and 2nd state
*       messages
*   times are close enough to be consistent
*
* Checks to be considered:
*   1st & 2nd state mnemonics have common border (requires list of bordering
*       states for each state)
*   roadway number is consistent with state mnemonics for both border sides
*       (requires list of interstate roadways for each state - note that this
*       automatically subsumes list of bordering states)
***********************************************************************/
{
    UCHR   first, second, n, m, tempa[CATEGORIES] ;
    UCHR   order[CATEGORIES], i;
    UINT   tempb[CATEGORIES];

/* Create ordered list of categories. This sorts the categories into
       a list which is in descending order of the number of received
       signals (Category.Count). This is so that in looking for potential
       crossing categories, we look first at those categories with the
       greatest number of received signals.                            */
```

```
for (i=0; i<Categories; ++i) {
  tempa[i]=i;
  tempb[i]=Category[i].Count;
} /* next m */
sort(Categories, tempb, tempa);
for (m=0; m<Categories; ++m) {
  order[m]=tempa[m];
} /* next m */

// try pairs of categories
for (first = 0, second = 1; first < Categories-1;)
{
   // check if pair agree if ((!strncmp( &Category[order[first]].Site[2],
               &Category[order[second]].Site[2], 4)) &&
       (!strncmp( &Category[order[first]].Site[7],
               &Category[order[second]].Site[7], 2))) // offset mag.
   { // pair agrees, determine direction
      First = order[first];
      Second = order[second];
      if (DetermineDirection() || DirectionAlgorithm2()) {
          P4 = P4 | 0x20;      //   Turn on Data Download LED
          ReportCrossing();
          P4 = P4 & 0xDF;      //   Turn off Data Download LED
      }

// prepare for next crossing

ReInitGlobals();  //  Re-initialize Global Variables for next e..
      return;
   }
      // select next pair if ( (second >= Categories-1) || // second cannot be advanced
           (Category[order[first+1]].Count + Category[order[first+2]].Count >
            Category[order[first]].Count + Category[order[second+1]].Count) )
      { // advance first
         first++;
         second = first + 1;
      }
      else // advance second
         second++;
} /* next */

// failed to find matching pair => crossing ambiguous => not reported
// prepare for next crossing ReInitGlobals();
return;

} // EvaluateCrossing void GetDataByte()
/*******************************************************************
   This subroutine now does two things.
   The first part of the routine checks the incoming data stream for the
   occurrence of the recognized state mnemonics CA, OR, and WA.  If it finds
   one of these mnemonics, it stuffs the first character of that mnemonic
   into a half-circular buffer.  Later, in the EvaluateCrossing function,
   this buffer, called the no_check_buff is examined to see if the data
   is consistent with a crossing.
   The second part stuffs the byte received into the
   data in buffer & increments the byte
   count. The routine checks for the two byte frame header (A5h A5h) at the
   beginning of each message.  If the header appears in the middle of a
   message, the routine resets and puts the header at the beginning.  When
   the message terminal count is reached, the routine sets a flag and
   stops further input.
********************************************************************
```

```
{
  LastTime = RxClock();

OldOutChar = NewOutChar;    // Shift in the new data...
  NewOutChar = DataBuffer[BuffOutPtr];

if (BuffOutPtr == 255) {    // Do we need to wrap around?
    BuffOutPtr = 0;
  }
  else  // no buffer wrap
  {
    ++BuffOutPtr;
  } // end if
  //  Do we have a premature Sync Frame?

if ((OldOutChar == 165) && (NewOutChar == 165)) {
    if (SSOutPtr == (43)) {   // Wrap Around
      SSOutPtr=0;
    }
    else // No wrap_around...
    {
      ++SSOutPtr;
    }
    DataInputIndex = 0;
  }
  else  // Not frame characters...
  {
    if ((OldOutChar=='C') && (NewOutChar == 'A')) {
      no_check_buff[no_check_ptr] = 'C';
      ++no_check_ptr;
    }
    else if ((OldOutChar=='O') && (NewOutChar=='R')) {
      no_check_buff[no_check_ptr] = 'O';
      ++no_check_ptr;
    }
    else if ((OldOutChar=='W') && (NewOutChar=='A')) {
      no_check_buff[no_check_ptr] = 'W';
      ++no_check_ptr;
    } if (no_check_ptr == 20) {  // If buffer needs to wrap...
      no_check_ptr=10;
      no_check_wrap = TRUE;
    }

DataInputBuffer[DataInputIndex] = NewOutChar;
    ++DataInputIndex;
    if (DataInputIndex==20) DataInputFlag=TRUE;
  } // end if return;
} void ModemISR() interrupt 4 using 2
/************************************************************
* This is the subroutine which services interrupts from the MODEM
*  (Data) port.
************************************************************/
{
  CrossingPending = TRUE;

if ((BuffInPtr == (BuffOutPtr-1)) || ((BuffOutPtr == 0)
      && (BuffInPtr == 255))) {
    SOCON = 0x40;    // Disable Interrupts - we've reached the end of
                     // our buffer
    InterruptsDisabled = TRUE;
  }
  else  // we still have room in our buffer for new characters...
  {
```

```c
    SOCON = 0x50;     // Necessary to read serial port...
    OldChar = NewChar;  // shift in new character...
    NewChar = SOBUF;
    DataBuffer[BuffInPtr] = NewChar;
    if (BuffInPtr == 255) {
      BuffInPtr = 0;
    }
    else
    {
      ++BuffInPtr;
    }
    if ((NewChar == DATA_PREFIX) && (OldChar == DATA_PREFIX)) {
      SSBuff[SSInPtr] = adc_get_value();  // Read old ADC value
      adc_start(0);                       // Trigger ADC for new measurement
      if (SSInPtr == (43)) { // If Buffer wrap-around
        SSInPtr = 0;
      }
      else   // no buffer wrap-around - just increment index
      {
        ++SSInPtr;
      }

} // end if

} // end if return;

} // end ModemISR void ReportCrossing()
/****************************************************************************
* ReportCrossing - Reports a crossing with a short text message.
*
* There are at least two different message types, which depends on which
* OBC the SEB computer will be feeding data to.  The message content
* depends upon the preprocessor directive.  If ARI is defined, the ARI
* message code will be generated.  If ARGO is defined, the ARGO Systems
* message code will be generated.  Other manufacturers' OBCs may ultimately
* be supported by this same scheme.
****************************************************************************/
{
/*--------------------------------------------------------------------------*/
#ifdef ARGO
  ULNG       temp, cross_time;
  UCHR       msg[86], hi_byte, lo_byte, elapsed[2], a[5], byte;
  UINT route_id, offset;
  a[4] = "\0";

ControlOutputBuffer[0] = 1;                              /* STX */ strncpy( &ControlOutputBuffer[1], &Category[First].Site[0], 2);
           /* state 1 */
  strncpy( &ControlOutputBuffer[3], &Category[Second].Site[0], 2);
           /* state 2 */ strncpy(a, &Category[First].Site[2],4);
           /* route id */
  route_id = atoi(a);
  hi_byte = route_id >> 8;
  lo_byte = route_id & 0x0F;
  ControlOutputBuffer[5] = hi_byte;
  ControlOutputBuffer[6] = lo_byte;

cross_time = CrossingTime + RxTxTimeDelta;          /* crossing time */
  byte = cross_time >> 24;
  ControlOutputBuffer[7] = byte;
  byte = ((cross_time & 0x0F00) >> 16);
  ControlOutputBuffer[8] = byte;
```

```
    byte = ((cross_time & 0x00F0) >> 8);
    ControlOutputBuffer[9] = byte;
    byte = cross_time & 0x000F;
    ControlOutputBuffer[10] = byte;

strncpy(a, &Category[First].Site[6], 2);          /* border offset */
    a[2] = "\0";
    offset = atoi(a);
    hi_byte = offset >> 8;
    lo_byte = offset & 0x0F;
    ControlOutputBuffer[11] = hi_byte;
    ControlOutputBuffer[12] = lo_byte;

temp = ElapsedTime / 60; /* Convert seconds of elapsed time into minutes */
    if (temp > 99) temp = 99; /* only two elapsed time characters are allowed,
                                 so if the elapsed time was more than
                                 99 minutes, then we have to truncate it.   */
    BEGINControlOutput();
#endif /* end of ARGO OBC code */

/*----------------------------------------------------------------------
------------------------------------------------------------------------*/

/***   ARI Message Code   ***/ ifdef ARI

ULNG        temp;
    UCHR        msg[85], elapsed[2], hours, minutes, month, day;
    UCHR        year, a[3], chours[2], cminutes[2], cmonth[2], cday[2];
    UCHR        cyear[2], i;
    ULNG        cross_time;
    UCHR        days[13]=(31, 31, 29, 31, 30, 31, 30, 31, 31, 30, 31, 30, 31);
    ULNG        nminutes, nseconds, nhours;

strcpy(a,"\0\0\0");

/* First, calculate the time we are going to report for the crossing.
       To do this, we add the number of seconds between the time of the
       initial transmitter contact and the estimated crossing to the
       Base Time which was sent by the transmitter.  This time must then
       be converted to a format compatible with the ARI OBC.           */ strncpy(a, &TxBaseTime[0],2);
    year = atoi(a);
    strncpy(a, &TxBaseTime[2],2);
    month = atoi(a);
    strncpy(a, &TxBaseTime[4],2);
    day = atoi(a);
    strncpy(a, &TxBaseTime[6],2);
    hours = atoi(a);
    strncpy(a, &TxBaseTime[8],2);
    minutes = atoi(a);

ElapsedTime = RxClock() - CrossingTime;
    nseconds = CrossingTime - RxBaseTime;
    nminutes = nseconds / 60;
    nhours = nminutes / 60;
    nminutes = nminutes % 60;

minutes += nminutes;
    if (minutes >=60) {
      minutes -= 60;
      ++hours;
    }
    hours += nhours;
    while (hours > 24) {
      hours -= 24;
      ++ day;
    }
    if (day > days[month]) {
```

```
      day = day - days[month];
      ++month;
    }
    if (month > 12) {
      month = 1;
      ++year;
    } strcpy(msg,"Passed XX/XX beacon on XXXX at XX:XX XX/XX/XX XX.X miles ")
    strcat(msg,"from border XX minutes ago.\r");
    strncpy(ControlOutputBuffer,msg,85);
    strncpy(&ControlOutputBuffer[7], &Category[First].Site[0], 2);
                    /* state 1 */
    strncpy(&ControlOutputBuffer[10], &Category[Second].Site[0], 2);
                    /* state 2 */
    strncpy(&ControlOutputBuffer[23], &Category[First].Site[2],4);
                    /* route id */ sprintf(chours, "%02d", (INT) hours);
    sprintf(cminutes, "%02d", (INT) minutes);
    sprintf(cmonth, "%02d", (INT) month);
    sprintf(cday, "%02d", (INT) day);
    sprintf(cyear, "%02d", (INT) year);
    strncpy(&ControlOutputBuffer[31], chours, 2);
    strncpy(&ControlOutputBuffer[34], cminutes, 2);
    strncpy(&ControlOutputBuffer[37], cmonth, 2);
    strncpy(&ControlOutputBuffer[40], cday, 2);
    strncpy(&ControlOutputBuffer[43], cyear, 2);

strncpy(&ControlOutputBuffer[46], &Category[First].Site[6], 2);
                    /* border offset */
    strncpy(&ControlOutputBuffer[49], &Category[First].Site[8], 1);

temp = ElapsedTime / 60;/* Convert seconds of elapsed time into minutes */
    if (temp > 99) temp = 99; /* only two elapsed time characters are allowed,
                                 so if the elapsed time was more than
                                 99 minutes, then we have to truncate it.*/
    sprintf(elapsed, "%02d", (INT) temp);
    strncpy(&ControlOutputBuffer[69], elapsed, 2);
    for (i=0; i<=84; ++i) con_port_send(ControlOutputBuffer[i]);
    con_port_send('\n');

#endif    /* end of ARI code */

/*----------------------------------------------------------------------*/

} // ReportCrossing void TimerISR() interrupt 11 using 2
/************************************************************************
* This is the timer Interrupt Service Routine.  The timer is set up
* to generate interrupts every half second or so.  When an interrupt
* occurs, a counter is incremented, and the TimerISR is exited.  When
* the current number of seconds since startup is needed, this
* TimerCounts is read, and the number of counts is converted to
* seconds.  This spares us from having to keep track of absolute
* time in the receive. We will use all time referenced to the
* transmitter time.  If a valid transmit time is never received, then
* an asterisk-filled time and date stamp is output.
************************************************************************/
{
  TM2CON = 0x0D;   // RESET INT. FOR LOW BYTE.
  TM2IR = 0x00;    // RESET INT. FOR HIGH BYTE.
  ++TimerCounts;
} void ValidateMessage()
/************************************************************************
* This function performs various tests on the content of the           *
```

```
 * received message to see if there's anythig wrong with it.  If    *
 * there is, then a flag for the type of error gets set, and a      *
 * counter for that type of error gets incremented.  If all is OK   *
 * then the message counter gets incremented, and this signal       *
 * gets added to the message record.  If the message record buffer  *
 * gets full, it wraps to its mid-point, a kind of "half-circular"  *
 * buffer.  It does this because the most imortant points are the   *
 * first n signals and the last n signals.                          *
 ********************************************************************/
{ idata UCHR  category, category_found;
   UCHR  *p;
   ULNG aTime, rxtime, rx_time, xmit_time;
   UING     timeDiff;

category = 0;
   rxtime = RxClock();

// determine category if (DataInputIndex != DATAMessageSize-2)  { // incorrect message size
     category = SIZEError;
     }
   else if (ParameterError() )  {     // bogus data in one of the fields...
     category = PARAMETERError;
     }
   else if (Checksum(&DataInputBuffer[0],18 ) != DataInputBuffer[19]) {
     category = CHECKSUMError;
     }
   else // message fits format
   {
     // see if message matches previous messages category_found = FALSE;
     while ((! category_found) && (category < Categories)) {
       if (!strncmp(DataInputBuffer, Category[category].Site,9)) {
         category_found = TRUE;
       }
       else
       {
         ++category;
       }
     } /* end while */ if (category >= Categories) {    /*  no match => new category  */
        if (category >= CATEGORIES)/* no more category entries available */
           category = OVERFLOWCategory;
        else // create category entry
        {
           strncpy(Category[category].Site,DataInputBuffer,9);
           Category[category].FirstTime = rxtime;
           Category[category].Count = 0;
           Categories++;
        }
     }
     MessageRcd[NextRecord].ReceivedTime = rxtime;
     MessageRcd[NextRecord].Category = category;
     MessageRcd[NextRecord].SS = SSBuff[SSOutPtr];
     if ((++NextRecord) >= MESSAGERecords) { // reached end of MessageRecord
       NextRecord = MESSAGERecordsHalf; // wrap to middle of MessageRecord
     }
     ++MessageRecords;

if (! valid_tx_time) {
       RxBaseTime = RxClock();
       strncpy(TxBaseTime, &DataInputBuffer[9],10);
       valid_tx_time = TRUE;
     }
   }
```

```c
      Category[category].LastTime = rxtime;
      ++Category[category].Count;

return;
}

UCHR ParameterError()
/*********************************************************************
* ParameterError - Checks if there is an error in any of the parameters in
* the message; returns TRUE if there are.
*********************************************************************/
{
   UCHR a, i, temp[3], state_not_found, j;

temp[2] = "\0";

/*    Check to make sure the State mnemonic is valid      */ i = 0;
   state_not_found = TRUE;
   while ((i < 3) && (state_not_found)) {
      if (!(strncmp(&DataInputBuffer[0], &State[2*i], 2))) {
         state_not_found = FALSE;
      }
      else
      {
         ++i;
      }
   } if (state_not_found) {          // no match => invalid state mn.
      return TRUE;
      }

/*    Check roadway number - should be all digits, e.g. "0005"    */ for (i=2; i<=5; ++i) {
     if (! isdigit(DataInputBuffer[i])) {
        return TRUE;   // roadway number field not all digits
     } /* end if */
   } /* next i */

/*    Check the roadway offset sign - should be a + or -    */ a = DataInputBuffer[6];
   if ((a != '+') && (a != '-'))  {
      return TRUE;   // invalid offset sign character
      }

/*    The roadway offset should be all digits      */ if (((!isdigit(DataInputBuffer[7])) || (!isdigit(DataInputBuffer[8])))) {
      return TRUE;
   }

/* If the time and date are not all digits, reject the message.
   If they ARE all digits, they must still make sense (month <= 12,
   etc). If they don't make sense, signal a transmitter time error  */ for (i=9; i<=18; ++i) {      // all chars should be digits...
      if (!isdigit(DataInputBuffer[i])) {
         return TRUE;
      } /* end if */
   } /* next i */ strncpy(temp, &DataInputBuffer[9], 2);            /* check the year */
   if ((atoi(temp) < 92) || (atoi(temp) > 110)) return(TRUE);
```

```
    strncpy(temp, &DataInputBuffer[11],2);          /* check the month  */
    if (atoi(temp) > 12) return(TRUE);
    strncpy(temp, &DataInputBuffer[13],2);          /* check the date   */
    if (atoi(temp) > 31) return(TRUE);
    strncpy(temp, &DataInputBuffer[15],2);          /* check the hours  */
    if (atoi(temp) > 60) return(TRUE);
    strncpy(temp, &DataInputBuffer[17],2);          /* check the minutes */
    if (atoi(temp) > 60) return(TRUE);

return(FALSE);
}

UCHR Checksum(UCHR s[], UCHR n)
/****************************************************************
* Calculates a simple 8-bit checksum of the n bytes starting at the  *
* address provided by char                                           *
****************************************************************/
{
  UCHR sum, i;

sum = 0;
  for (i=0; i<= n; ++i) sum += s[i];
  return sum;

} void con_port_send(UCHR temp)
/****************************************************************
* This function sends the character contained in temp to the Control
* Port (UART), which is connected to the on-board computer.
****************************************************************/
{
        UCHR status, xmit_done;

UART_XMIT = temp;
        xmit_done = FALSE;
        while(!xmit_done)
        {
                status = UART_SR;
                status &= 0x04;
                if (status == 0x04) xmit_done = TRUE;
        }
}

UCHR modem_recv()
/****************************************************************
* Receive a character from the MODEM port
****************************************************************/
{
        UCHR   modem_rdy, status;

modem_rdy = FALSE;
        while (!modem_rdy)
        {
                status = S0CON;
                status &= 0x01;
                if (status == 0x01) modem_rdy = TRUE;
        }
        S0CON = 0x50;
        return(S0BUF);
}
```

What is claimed is:

1. A beacon system for automatically marking and identifying a boundary landmark along a path of travel to a data gathering device in a moving vehicle, comprising:

a radio beacon station placed adjacent the boundary landmark for broadcasting as a first beacon signal a first location signal and as a second beacon signal a second location signal, said first and second location signals being transmitted from a single location on a single frequency alternately in opposite directions along a path of travel; and a radio receiving means, said radio receiving means including a radio receiver for said single frequency and a data analysis means, said radio receiving means being disposed in the moving vehicle for receiving said first and second location signals from the beacon station as the vehicle approaches and passes the boundary landmark, said data analysis means including means for determining from reception of both the first location signal and the second location signal the point of passing of the boundary landmark.

2. A beacon system for automatically marking and identifying a boundary landmark along a path of travel to a data gathering device in a moving vehicle, comprising:

a radio beacon station placed adjacent the boundary landmark for broadcasting as a first beacon signal a first location signal and as a second beacon signal a second location signal, said first and second location signals being transmitted on a single frequency alternately in generally opposite directions along a path of travel, said beacon station including:

first and second directional antennas disposed to radiate in opposite directions along the path of travel, said directional antennas each having significant back attenuation;

a packet modulator means for generating said first and second location signals as data packets carrying alternately different digital information;

a radio frequency transmitter for broadcasting the first and second location signals as different data packets; and an r.f. switcher for switching signal output of the transmitter between the first and second directional antennas in synchronization with the first and second location signals; and a radio receiving means, said radio receiving means including a radio receiver for said single frequency and a data analysis means, said radio receiving means being disposed in the moving vehicle for receiving said first and second location signals from the beacon station as the vehicle approaches and passes the boundary landmark, said data analysis means including means for determining from reception of both the first location signal and the second location signal the point of passing of the boundary landmark.

3. The beacon system according to claim 2 wherein the receiving means includes:

a receiving packet demodulator coupled to said receiver; and wherein said data analysis means is coupled to receive data from said receiving packet demodulator.

4. The beacon system according to claim 3 wherein said data analysis means comprises:

a data buffer means coupled said receiving demodulator for capturing a succession of packets received from said receiving packet demodulator, said data buffer means including means for preserving initially-received complete packets and for preserving last-received complete packets; and means for processing said preserved packets from the data buffer to determine, from a first succession of stored first location signals and a second succession of stored second location signals, an exact point of passing of the boundary landmark as marked by location of the transmitter.

5. The beacon system according to claim 4 wherein the data analysis means further includes means for initiating the recording of a mileage reading for the moving vehicle upon determination of the exact point of passing the boundary landmark.

6. A beacon system for automatically marking and identifying a boundary landmark along a path of travel to a data gathering device in a moving vehicle, comprising:

a radio beacon station placed adjacent the boundary landmark for broadcasting as a first beacon signal a first location signal and as a second beacon signal a second location signal, said first and second location signals being transmitted on a single frequency alternately in opposite directions along a path of travel, said beacon station including directional antenna means having a first directionality and a second directionality disposed to broadcast in generally opposite directions along the path of travel, said directional antenna means having significant back attenuation with respect to said first and second directionality; and a radio receiving means, said radio receiving means including a radio receiver for said single frequency and a data analysis means, said radio receiving means being disposed in the moving vehicle for receiving said first and second location signals from the beacon station as the vehicle approaches and passes the boundary landmark, said data analysis means including means for determining from reception of both the first location signal and the second location signal the point of passing of the boundary landmark.

* * * * *